United States Patent Office 3,053,825
Patented Sept. 11, 1962

3,053,825
PREPARATION OF ESTERS OF AMINO ACIDS AND PEPTIDES FROM PROTEIN MATERIALS
Emil Kaiser and Ellen P. Gunther, Chicago, Ill., assignors, by mesne assignments, to Armour-Pharmaceutical Company, a corporation of Delaware
No Drawing. Filed Dec. 13, 1956, Ser. No. 628,007
2 Claims. (Cl. 260—112)

This invention relates to a simplified method for the preparation of esters of amino acids and peptides from proteins. It is more particularly related to a method whereby proteins can be hydrolyzed and the resulting amino acids esterified in a single step.

The hydrolytic splitting of proteins and peptides in aqueous acid and alkaline solution is a well known procedure. The breakdown of —CONH— grouping yields free amino and free carboxyl groups, and the final products of the hydrolysis are amino acids.

The esters of amino acids are very desirable compounds which may be used as intermediates in the preparation of various chemicals and polymers. To obtain amino acid esters from natural sources, it heretofore has been necessary first to hydrolyze the proteins, and then to esterify the resulting amino acid mixture. Many attempts have been made to prepare amino acid esters directly from peptide esters by use of alcohol solutions containing hydrochloric acid, but this procedure has several weaknesses. The volatility of the hydrochloric acid causes difficulty, and proteins insoluble in the hydrochloric acid containing alcohol can not be degraded. It has also been shown in the literature that a saturated alcoholic solution of hydrogen chloride is a milder reagent than a saturated aqueous solution of hydrogen chloride because of the lower solubility of hydrochloric acid in alcohol than in water, and also because an alcoholic solution of hydrochloric acid cannot be heated to as high a temperature as an aqueous solution of the same acid.

It is accordingly an object of this invention to provide a method whereby proteins can be hydrolyzed and the resulting amino acid esterified in a single step procedure. It is also an object to provide a procedure whereby proteins are almost completely degraded and esterified in a single step. Further objects and advantages of the invention will appear as the specification proceeds.

We have discovered that even the most insoluble proteins can be transformed into low molecular weight peptide esters or into amino acid esters by the use of organic sulfonic acids. In the preferred form of our procedure, proteins are first heated with a liquified, i.e. melted, organic sulfonic acid, and then a primary or secondary alcohol is added to the mixture. By this pretreatment even such insoluble proteins such as hoofs and feathers are made alcohol-soluble. By heating the mixture of alcohol, protein and organic sulfonic acid, the protein molecule breaks down to smaller fragments and at the same time the carboxyl groups are esterified. The hydrolyzed ester mixture can be freed from the acid used for the hydrolysis and the amino acid esters and peptide esters separated with organic solvents.

In this novel procedure the organic sulfonic acid used for the simultaneous hydrolysis and esterification can be recovered as will be shown by the examples set forth in this specification.

It is not always necessary to pretreat the proteins, and organis sulfonic acids; some proteins, such as plasma albumin, gelatin, hemoglobin, etc., can be brought into alcohol solution by heating them with alcohol containing the organic sulfonic acids.

The organic sulfonic acids which are useful in this invention may be illustrated by such acids as toluene sulfonic acid, naphthalene-$\beta$-sulfonic acid, benzene sulfonic acid, xylene sulfonic acid, ethyl benzene sulfonic acid, methyl sulfonic acid, butyl sulfonic acid and benzene disulfonic acids. The hydrated form of the sulfonic acids may be used in the method of the invention as shown in the examples.

While, in general, esterification procedures are more complete in anhydrous alcohols, we have observed that the presence of small amounts of water is even beneficial in our alcoholysis process. Such water may be introduced directly into the reaction mixture or may be introduced as water of crystallization with the sulfonic acid. We think that this anomaly can be explained by our finding that considerable amounts of organic sulfonic acids are esterified when our process is carried out with continuous removal of water. It is known that organic sulfonic acid esters react with basic amino groups and form substituted amines. Thus, the esters of the organic sulfonic acids may react with the amino groups formed in the alcoholysis procedure and lower the amount of free $NH_2$ groups found in the reaction mixture. The amino acid esters can be separated from the reaction mixture by various means. We prefer to remove the alcohol by vacuum distillation, and to treat the alcohol-free residue with ammonia gas in the presence of a solvent like benzene, chloroform, or carbontetrachloride. The ammonium salt of the organic sulfonic acid is formed, and the amino acid esters are obtained in the free form. The ammonium salts are insoluble in the solvents, whereas the amino acid esters go into solution. The organic sulfonic acid can be regenerated from its ammonium salt and can be used for the alcoholysis of another batch of protein.

The invention may be more fully illustrated by the following specific examples:

*Example I*

Fifteen-hundred grams of p-toluenesulfonic acid monohydrate was heated to 110° C. At this temperature the acid liquified. To the liquid acid, 500 grams of powdered feather meal was added, and the mixture was maintained at 110° C. for one hour. Then 5 liters of methanol was added, and the mixture was refluxed for 48 hours. The methanol was distilled at reduced pressure, and a dark, sticky residue was obtained. To this residue, 5 liters of carbontetrachloride was added, and anhydrous ammonia was bubbled through the solvent. The dark, tarry residue became granular, and the carbontetrachloride took up color. The carbontetrachloride was filtered off, and the solid was treated again with carbontetrachloride and ammonia. The carbontetrachloride-insoluble material weighed 1600 grams. It was the ammonium salt of p-toluenesulfonic acid.

To the combined carbontetrachloride filtrates, 450 grams of acetic anhydride was added, and the mixture was allowed to stand overnight. Some dark tar settled; the clear upper layer was drawn off.

The carbontetrachloride was distilled off in vacuum. The residue of the carbontetrachloride solution contained a mixture of acetylated amino acid esters with acetic acid and acetic anhydride. The mixture was separated by fractionation. After the acetic acid and acetic anhydride was distilled off, the acetylated amino acid esters were distilled in the vacuum of an oil pump. The distillation was carried on until all the acetylated amino acid esters which could be distilled without decomposition were carried over. Three hundred and twenty-four grams of distillate and 92 grams of non-distillable material were obtained. In the distillate the acetylated esters of serine, threonine, glycine, valine, alanine, leucine, isoleucine, proline, and lesser amounts of aspartic and glutamic acids were found.

We also found that many other organic sulfonic acids and primary or secondary alcohols may be used in this procedure. For example, we have found that the p-toluene sulfonic acid may be replaced in the reaction by such acids as dimethylbenzene sulfonic acid, ethylbenzene sulfonic acid, benzene disulfonic acids, and many different alkyl sulfonic acids such as methylsulfonic acid, ethylsulfonic acid, butylsulfonic acid, dodecylsulfonic acid, etc. While methanol was used as the alcohol in the reaction above we have found that we may also use such primary and secondary alcohols as ethanol, isopropanol, n-propanol, isobutanol, n-butanol, amyl alcohol, hexyl alcohol, benzyl alcohol and cyclohexanol.

*Example II*

To compare alcoholysis of proteins in the presence of small amounts of water and under conditions where water is continuously removed, two experiments were set up. For both experiments the same crystalline bovine albumin and aliquots of the same p-toluenesulfonic acid stock solution were used.

Forty-seven and one half grams of p-toluenesulfonic acid monohydrate (0.25 mol) was dissolved in n-butanol by stirring at room temperature, and the volume was made up to 250 ml. with n-butanol. To each of two 10 ml. portions of this solution, 500 mg. of crystalline bovine albumin was added. One of the reaction mixtures was refluxed with a trap which separated the water from the butanol. The other mixture was kept under reflux without water separation. After 65 hours of refluxing, both solutions were cooled, diluted to 50 ml. and the amount of basic amino groups determined by the following method.

Five ml. aliquots of the butanol solutions were titrated with 0.1 N methanolic sodium hydroxide solution, using 0.1% phenolphthalein in alcohol solution as indicator. After the pink color of the phenolphthalein appeared, thymol blue (0.1% alcohol solution) was added as indicator. The color was greenish blue (pH above 8). Then the solution was titrated with 0.1 N hydrochloric acid in n-propanol until the color changed from yellow to a shade of red (pH about 2). The first titration gave the amount of p-toluenesulfonic acid; the second titration gave the amount of basic amino groups plus ammonia present in the hydrolysate. The ammonia was determined by distilling it with alkali into a known amount of acid and back titrating the remaining acid. The value found for ammonia was deducted from the value found by titrating the hydrolysate with thymol blue indicator. Thus, the amount of amino groups belonging to the amino acid esters was determined by this method. We found that from one gram of crystalline plasma albumin 9.32 milliequivalent of $NH_2$ groups were obtained by refluxing for 65 hours with butanol and toluenesulfonic acid. By water removal through a trap, only 7.38 milliequivalents of amino groups were obtained from one gram of the plasma albumin.

*Example III*

To follow the course of alcoholysis, crystalline plasma albumin was treated with p-toluenesulfonic acid under reflux, as described in Example II, for various time intervals. The amount of basic amino groups belonging to the amino acid esters was determined by titration. The values are given in the following table:

| Time in Hours | Milliequivalents of Ammonia in 1 gram of Protein | Milliequivalents of Basic $NH_3$ Groups in 1 gram of Protein |
| --- | --- | --- |
| ½ | 0.68 | 2.28 |
| 1 | 0.74 | 2.68 |
| 2 | 0.72 | 3.94 |
| 4 | 0.70 | 5.22 |
| 6 | 0.74 | 5.56 |
| 8 | 0.70 | 6.22 |
| 18 | 0.74 | 7.72 |
| 24 | 0.72 | 8.46 |
| 30 | 0.72 | 8.66 |
| 48 | 0.68 | 9.32 |
| 72 | 0.70 | 9.50 |

*Example IV*

One half of a gram of feather meal was added to 0.75 gram of a commercially available mixture of alkanesulfonic acids containing methylsulfonic acid, ethylsulfonic acid, and propyl sulfonic acid. The mixture was placed in a 110° C. oven for one hour. Then 10 ml. of n-butanol was added and the solution refluxed for 24 hours. Then the volume was made up to 50 ml. and aliquots of the solution were titrated as described in Example II. The amount of milliequivalents of amino groups per gram of feather meal was 9.6.

*Example V*

To 1.24 grams of benzenesulfonic acid, kept molten by heating it to 125° C., 0.5 gram of feather meal was added and the mixture kept at 125° C. for one hour. Then 10 ml. of n-butanol was added and the mixture refluxed for 18 hours. By titration 8.7 milliequivalents of amino groups were found per gram of feather meal.

*Example VI*

One-half gram of feather meal and 1.77 grams of naphthalene-$\beta$-sulfonic acid monohydrate were reacted as described in Example V. By titration 8.5 milliequivalents of amino groups per gram of feather meal were found.

*Example VII*

To 300 grams of molten p-toluenesulfonic acid, 100 grams of dried whole beef blood was added. The mixture was kept at 110° C. for 2 hours. Then 500 ml. of n-butanol was added and the mixture refluxed for 24 hours. The butanol was removed by vacuum distillation and 1000 ml. of carbontetrachloride added to the residue. Ammonia gas was passed through the mixture until all of the p-toluenesulfonic acid was transformed into its ammonium salt. The amino acid butyl esters dissolved in the carbontetrachloride. After filtration 80 ml. of acetic anhydride was added to the filtrate and the solution was left standing at room temperature overnight. The carbontetrachloride, acetic acid and unreacted acetic anhydride were distilled in vacuum and the residue distilled at pressures ranging from 0.30–0.80 mm. Weight of the distillate was 81 grams. Analysis of the hydrolyzed distillate showed the presence of the following amino acids (percentage calculated on the weight of acetylated amino acid butyl esters):

| | Percent |
|---|---|
| Phenylalanine | 4.1 |
| Serine | 1.0 |
| Threonine | 1.6 |
| Leucine | 10.0 |
| Isoleucine | 0.9 |
| Valine | 5.6 |
| Glutamic acid | 5.0 |
| Aspartic acid | 9.0 |
| Glycine | 3.4 |
| Alanine | 6.5 |
| Proline | 3.1 |

*Example VIII*

Sixty grams of gelatin, 200 g. of p-toluenesulfonic acid monohydrate and 1,000 ml. of 3A absolute methyl alcohol were stirred and refluxed for 24 hours. The solution was then cooled to 0° C. and 40 g. of sodium hydroxide dissolved in 1000 ml. of 3A alcohol was added. The temperature was kept below 0° C. during the addition of the alkali. The solution was filtered and 169 g. of sodium p-toluene-sulfonate obtained. The filtrate was evaporated in vacuum below 30° C. The residue was a syrup to which benzene was added. Ammonia gas was bubbled through to remove residual p-toluenesulfonic acid. The benzene solution was filtered and evaporated in vacuum below 30° C. The oily residue was extracted with several portions of ether. The combined ether filtrates were evaporated. For further identification the mixture was acetylated and distilled in high vacuum. A mixture of acetylated amino acid methyl esters was obtained. The particular amino acids can be identified by hydrolysis and paper chromatography.

*Example IX*

Forty-five grams of feather meal, 150 g. of p-toluenesulfonic acid monohydrate and 750 ml. of 3A methyl alcohol were refluxed for forty-eight hours. The solution was cooled and filtered, only 4.8 g. of insoluble material remained. The filtrate was evaporated in vacuum and the residue refluxed with 250 ml. of 3A absolute alcohol for 16 hours. The alcohol was then distilled off in vacuum and the residue mixed with 500 ml. of benzene. Ammonia gas was bubbled through the mixture. A granular solid was formed which was filtered off. This precipitate was the ammonium p-toluenesulfonate. It weighted 148 g. corresponding to a quantitative recovery of the p-toluenesulfonic acid (150 g. of p-toluenesulfonic acid monohydrate was used, molecular weight 190.2. Molecular weight of ammonium salt (anhydrous) 189.2).

The benzene filtrate was evaporated in vacuum below 30° C. The residue was extracted several times with ether. The ether was evaporated leaving 26 g. of an ether soluble oil, a mixture of amino acid esters.

The ether-insoluble material was alcohol and acetone soluble. It weighed 17 g. and showed an alkaline reaction indicating that the carboxyl groups were esterified and free basic amino groups were present.

The individual amino acid esters can be identified by distillation, hydrolysis of the distillate and paper chromatographic separation of the amino acids.

While in the foregoing specification and examples we have illustrated various embodiments of the invention, it is understood that many modifications and changes may be made all within the spirit and scope of the invention.

We claim:

1. A method of preparing esters of amino acids and peptides from proteins wherein the protein is hydrolyzed with an organic sulfonic acid having the formula $RSO_3H$ wherein R is a radical selected from the group consisting of aliphatic hydrocarbon radicals having from 1 to 12 carbon atoms, phenyl and naphthyl radicals, and alkyl phenyl and alkyl naphthyl radicals wherein the alkyl group contains from 1 to 3 carbon atoms, and the hydrolyzed protein is esterified by adding alcohol, said alcohol having at least 1 hydrogen atom attached to a carbon atom bearing the hydroxyl group, characterized in that the protein, organic sulfonic acid and the alcohol are reacted together in a single step to bring about simultaneously the said hydrolysis and esterification.

2. The method as claimed in claim 1 wherein the organic sulfonic acid is toluene sulfonic acid.

References Cited in the file of this patent

FOREIGN PATENTS 927,929   Germany _____ May 20, 1955

OTHER REFERENCES

Anson: Advances in Protein Chemistry, vol. VII, pages 22–23 (1952), Academic Press Inc., publishers, New York, New York.

Greenberg: Amino Acids and Proteins, Charles C. Thomas, Springfield, Ill., (1951), pages 32, 550–1.

Fraenkel-Conrate et al.: J. Biol. Chem., vol. 161 (1945), pages 259–68.

Schramm et al.: Chem. Abstracts, vol. 43, page 668(b) (1949).

Waldschmidt-Leitz et al.: Chem. Abstracts, vol. 45, page 6672 (1951).